Patented Jan. 3, 1928.

1,654,844

UNITED STATES PATENT OFFICE.

HERMANN STAUDINGER, OF FREIBURG, BADEN, GERMANY, ASSIGNOR TO THE FIRM SOCIETY OF CHEMICAL INDUSTRY IN BASLE, OF BASEL, SWITZERLAND.

CAOUTCHOUC DERIVATIVE AND PROCESS OF MAKING THE SAME.

No Drawing. Application filed December 22, 1926, Serial No. 156,530, and in Switzerland December 31, 1925.

My invention relates to the manufacture of hydro-cyclocaoutchouc. It comprises the process of manufacture thereof and the new product itself as well as its application for industrial purposes.

It is known that when caoutchouc is heated it is profoundly changed and, losing part of its double linkings, passes into a cyclocaoutchouc, which has physical and chemical properties differing from those of ordinary caoutchouc. This cyclocaoutchouc can be obtained in the form of a solid amorphous powder, or of flocks, which have the appearance of gutta-percha. It is not fully saturated but contains for .4 to 5 isoprene residues one double linking, so that it reacts with oxidizing agents, for instance concentrated nitric acid.

According to this invention, such unsaturated cyclocaoutchouc can be converted into fully saturated products by hydrogenating it with hydrogen in presence of a catalyst, preferably a metal of the 8th series of the periodic system. This hydrogenation is advantageously carried out at a temperature above 200° C. and under raised hydrogen pressure; there may also be present an indifferent solvent, such as benzines, particularly paraffin hydrocarbons and cycloparaffin hydrocarbons.

In order to obtain such hydro-cyclocaoutchouc another mode of operating is first to heat caoutchouc, preferably with addition of an indifferent solvent, to 200-250° C. and thereby convert it into the cyclic compound; this operation may be accelerated by addition of an acid, such as acetic acid. The catalyst is then added and the cyclo-caoutchouc hydrogenized under hydrogen pressure.

Yet another procedure is to mix caoutchouc with a slowly acting catalyst, such as copper powder, and to heat the mixture under hydrogen pressure to about 250-270° C. The formation of the cyclo-compound first occurs and this compound is only gradually reduced to the hydro-cyclocaoutchouc.

The hydro-cyclocaoutchouc obtained by one or other of the foregoing procedures is a solid, white, amorphous mass, soluble in benzene, chloroform or ether; it is not soluble in alcohol or acetone and therefore can be purified by dissolving it in the first named solvents and precipitating it by addition of alcohol or acetone. It is different from the hydrocaoutchouc previously described (Staudinger and Fritschi, Helv. v. 785) in that it is solid, whereas the previously known hydro-caoutchouc is a tough highly viscous mass. In common to both these caoutchouc derivatives is their chemical indifference. They can further be distinguished easily with aid of the refractometer, since pure hydrocaoutchouc has the refractive index $n\frac{16}{D}=1.4770$, whereas pure hydro-cyclocaoutchouc has the refractive index $n\frac{16}{D}=1.5263$. The specific gravity of hydro-cyclocaoutchouc is greater than that of hydrocaoutchouc. The hydro-cyclocaoutchouc is useful for the manufacture of plastic masses and as a substitute for guttapercha.

The following examples illustrate the invention:—

*Example 1.*—Cyclocaoutchouc is triturated with finely subdivided platinum or nickel, and then heated in a rotary autoclave under 50–80 atmospheres pressure of hydrogen for 20–30 hours to 270° C. After cooling, the mass is extracted with benzene, the extract filtered from the catalyst and the hydro-cyclocaoutchouc obtained either by distilling away the benzene with steam or by ordinary distillation, or the hydro-cyclocaoutchouc may be precipitated by adding alcohol to the benzene extract.

*Example 2.*—Caoutchouc is heated in a solution of ether or benzene for a day in an autoclave to 250° C., whereby the caoutchouc is converted into cyclo-caoutchouc. The solvent is distilled and to the residue is added finely subdivided nickel carried on pumice and the mixture is heated under hydrogen pressure in a rotary autoclave for 6 hours at 290° C. The hydro-cyclocaoutchouc is worked up as in the preceding example.

*Example 3.*—Caoutchouc is mixed with copper oxide carried on pumice and the mixture is heated under hydrogen pressure in an autoclave having a stirring device for 4 hours. The solid hydro-cyclocaoutchouc thus obtained is worked up in the manner described in the first example.

What I claim is:

1. A process for the manufacture of hydro-cyclocaoutchouc by reducing cyclocaoutchouc in presence of a catalyst by means of hydrogen.

2. A process for the manufacture of hydro-cyclocaoutchouc by reducing cyclocaoutchouc in presence of a catalyst by means of hydrogen under pressure.

3. A process for the manufacture of hydro-cyclocaoutchouc by reducing cyclocaoutchouc in presence of a catalyst by means of hydrogen at temperatures above 200° C.

4. A process for the manufacture of hydro-cyclocaoutchouc by reducing cyclocaoutchouc in presence of a catalyst by means of hydrogen under pressure and at temperatures above 200° C.

5. A process for the manufacture of hydro-cyclocaoutchouc by reducing cyclocaoutchouc in presence of a metal of the 8th series of the periodic system by means of hydrogen.

6. A process for the manufacture of hydro-cyclocaoutchouc by reducing cyclocaoutchouc in presence of a metal of the 8th series of the periodic system by means of hydrogen under pressure.

7. A process for the manufacture of hydro-cyclocaoutchouc by reducing cyclocaoutchouc in presence of a metal of the 8th series of the periodic system by means of hydrogen at temperatures above 200° C.

8. A process for the manufacture of hydro-cyclocaoutchouc by reducing cyclocaoutchouc in presence of a metal of the 8th series of the periodic system by means of hydrogen under pressure and at temperatures about 200° C.

9. As new article of manufacture hydro-cyclocaoutchouc representing a solid, white, amorphous mass, soluble in benzene, chloroform or ether, insoluble in alcohol and acetone, having the refraction index $n\frac{16}{D} = 1.5263$.

In witness whereof I have hereunto signed my name this 11th day of December, 1926.

HERMANN STAUDINGER.